United States Patent
Chang et al.

(10) Patent No.: US 9,515,372 B2
(45) Date of Patent: Dec. 6, 2016

(54) APPARATUS AND METHOD FOR BEAM LOCKING IN A WIRELESS COMMUNICATION SYSTEM

(75) Inventors: Young-Bin Chang, Anyang-si (KR); Rakesh Taori, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1021 days.

(21) Appl. No.: 13/549,280

(22) Filed: Jul. 13, 2012

(65) Prior Publication Data

US 2013/0017836 A1    Jan. 17, 2013

(30) Foreign Application Priority Data

Jul. 15, 2011 (KR) .................. 10-2011-0070330

(51) Int. Cl.
| | |
|---|---|
| *H04W 72/00* | (2009.01) |
| *H01Q 1/12* | (2006.01) |
| *H01Q 1/24* | (2006.01) |
| *H01Q 3/26* | (2006.01) |
| *H04B 7/08* | (2006.01) |
| *H04B 7/06* | (2006.01) |

(52) U.S. Cl.
CPC ............ *H01Q 1/1257* (2013.01); *H01Q 1/246* (2013.01); *H01Q 3/26* (2013.01); *H04B 7/0617* (2013.01); *H04B 7/086* (2013.01)

(58) Field of Classification Search
CPC . H04W 24/00; H04W 72/082; H04W 16/10; H04W 72/04; H04W 28/04; H04W 16/28; H04W 16/24; H01Q 1/246; H04B 7/0617; H04B 7/0408

USPC ............... 455/63.6, 67.11, 452.1, 461, 517, 455/562.1, 575.7; 342/368, 373, 374
See application file for complete search history.

(56) References Cited

U.S. PATENT DOCUMENTS

| | | | |
|---|---|---|---|
| 6,184,825 B1 | 2/2001 | Wehner et al. | |
| 6,917,337 B2 | 7/2005 | Iida et al. | |
| 7,472,409 B1 | 12/2008 | Linton | |
| 7,515,874 B2 | 4/2009 | Nikolajevic et al. | |
| 2005/0020311 A1 | 1/2005 | Goldberg et al. | |
| 2005/0179579 A1 | 8/2005 | Pinder et al. | |
| 2006/0232468 A1 | 10/2006 | Parker et al. | |

(Continued)

FOREIGN PATENT DOCUMENTS

| | | |
|---|---|---|
| CN | 1898838 | 1/2007 |
| CN | 101808341 | 8/2010 |

(Continued)

OTHER PUBLICATIONS

Extended European Search Report dated Dec. 22, 2014 in connection with European Application No. 12814659.4; 7 pages.

(Continued)

*Primary Examiner* — Nhan Le

(57) ABSTRACT

According to one embodiment, an apparatus for beamforming includes a detector for measuring at least one change of movement and rotation of an apparatus; and a calculator for determining a beamforming parameter for aligning a beam direction with another apparatus by compensating for the change of the beam direction according to at least one of the movement and the rotation.

30 Claims, 16 Drawing Sheets

(56) References Cited

U.S. PATENT DOCUMENTS

| | | | |
|---|---|---|---|
| 2007/0054617 A1* | 3/2007 | Nikolajevic | H04B 7/0619 455/41.2 |
| 2007/0205943 A1 | 9/2007 | Nassiri-Toussi et al. | |
| 2010/0164802 A1 | 7/2010 | Li et al. | |
| 2012/0208567 A1* | 8/2012 | Mesecher | H04B 7/086 455/456.5 |
| 2013/0040682 A1* | 2/2013 | Chang | H01Q 1/243 455/517 |

FOREIGN PATENT DOCUMENTS

| | | |
|---|---|---|
| JP | 2004-064741 | 2/2004 |
| JP | 2006-238425 | 9/2006 |
| JP | 2006-261891 | 9/2006 |

OTHER PUBLICATIONS

International Search Report dated Jan. 28, 2013 in connection with International Patent Application No. PCT/KR2012/005166, 3 pages.
Written Opinion of International Searching Authority dated Jan. 28, 2013 in connection with International Patent Application No. PCT/KR2012/005166, 4 pages.
Chinese Office Action issued for CN 201280045231.3 dated Dec. 31, 2015, 14 pgs.
Japanese Office Action issued for JP 2014-521543 dated Dec. 14, 2015, 5 pgs.
Patent Examination Report dated Feb. 26, 2016 in connection wtih Australian Patent Application No. 2012284745, 3 pages.
Second Office Action dated Sep. 1, 2016 in connection with Chinese Application No. 2012800452313, 14 pages.
Notice of Preliminary Rejection dated Sep. 5, 2016 in connection with Japanese Application No. 2014-521543, 6 pages.

* cited by examiner

APPARATUS AND METHOD FOR BEAM LOCKING IN A WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jul. 15, 2011 and assigned Serial No. 10-2011-0070330, the entire disclosure of which is hereby incorporated by reference.

TECHNICAL FIELD OF THE INVENTION

The present invention relates generally to a wireless communication system, and more particularly, to an apparatus and method for beam locking in a wireless communication system.

BACKGROUND OF THE INVENTION

To enhance performance of wireless communication systems, beamforming is often applied. In general, beamforming increases signal reception sensitivity of a particular receiver by giving directionality to the beam using multiple antennas. The beamforming may be categorized according to transmission beamforming and reception beamforming based on which communication element conducts the beamforming operation.

FIG. 1 depicts beams of a base station applying a beamforming operation in a wireless communication system. Referring to FIG. 1, the base station covers a plurality of sectors and forms a plurality of beams having directionality in each sector. When the beamforming is applied, the propagation pattern narrows. Hence, it is necessary to use more beams than antennas in the sector in order to service one base station cell or sector. Because of the narrow beamforming of the base station, a user station can obtain better channel state.

The user station needs to select the best beam from the multiple beams of the base station and select a new beam according to its rotation or movement. As the beam becomes narrower, the beam is selected more on a more frequent basis. When the user station applies beamforming, the best channel state is attained only when the beam direction of the base station matches the beam direction of the user station. However, unlike the stationary base station, the user station is mobile. Moreover, the direction of the station facing the base station can easily change. As a result, the beam directions of the user station and the base station can be misaligned frequently.

SUMMARY OF THE INVENTION

To address the above-discussed deficiencies of the prior art, it is a primary aspect of the present invention to provide an apparatus and a method for maintaining a beam direction of a user station which performs beamforming in a wireless communication system.

Another aspect of the present invention is to provide an apparatus and a method for compensating for a beam direction based on movement and/or rotation of a user station in a wireless communication system.

According to one aspect of the present invention, an apparatus for beamforming in a wireless communication system includes a detector for measuring at least one change of movement and/or rotation of the apparatus, and a calculator for determining a beamforming parameter for aligning a beam direction with another apparatus by compensating for the change of the beam direction according to at least one of the movement and the rotation.

According to another aspect of the present invention, a method for beamforming in a wireless communication system includes measuring at least one change of movement and rotation of an apparatus, and determining a beamforming parameter for aligning a beam direction with another apparatus by compensating for the change of the beam direction according to at least one of the movement and the rotation.

According to yet another aspect of the present invention, a method of a user station in a wireless communication system includes generating a control message informing that a beam locking scheme is supported to maintain a beam direction in a reference direction by compensating for a change of the beam direction caused by movement and/or rotation of the user station, and transmitting the control message to a base station.

According to another aspect of the present invention, a method of a base station in a wireless communication system includes receiving a control message informing that a beam locking scheme is supported to maintain a beam direction in a reference direction by compensating for a change of the beam direction caused by movement and/or rotation of a user station, and determining based on the control message whether the user station supports the beam locking scheme.

Other aspects, advantages, and salient features of the invention will become apparent to those skilled in the art from the following detailed description, which, taken in conjunction with the annexed drawings, discloses example embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 2 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present invention relates to an apparatus and a method for maintaining a beam direction in beamforming of the wireless communication system. Example embodiments of the present invention provide a technique for maintaining a beam direction of a user station in a wireless communication system.

FIGS. 2A through 2D illustrate example beam directions of a base station and a user station in a wireless communication system according to an embodiment of the present invention.

Figure 1:
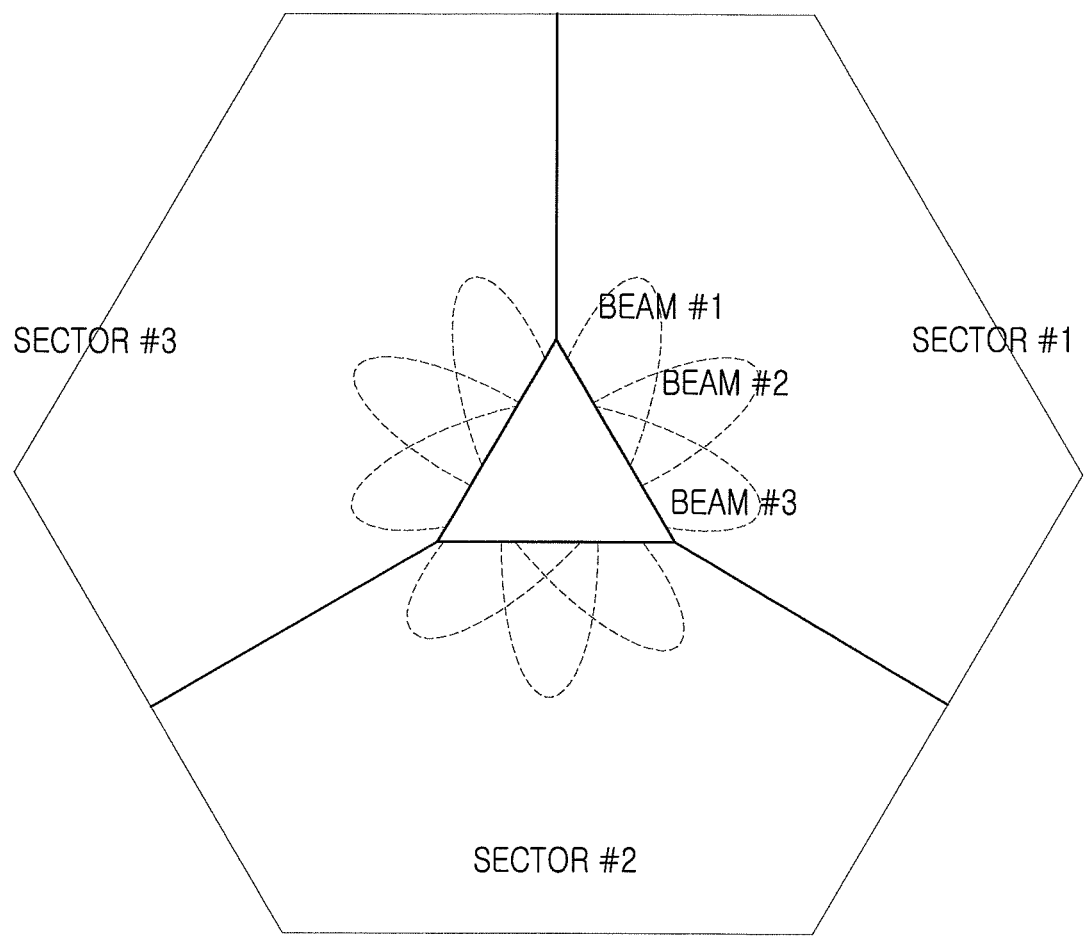
FIG. 1 illustrates example beams of a base station adopting beamforming technology in a wireless communication system.
Figure 2A:
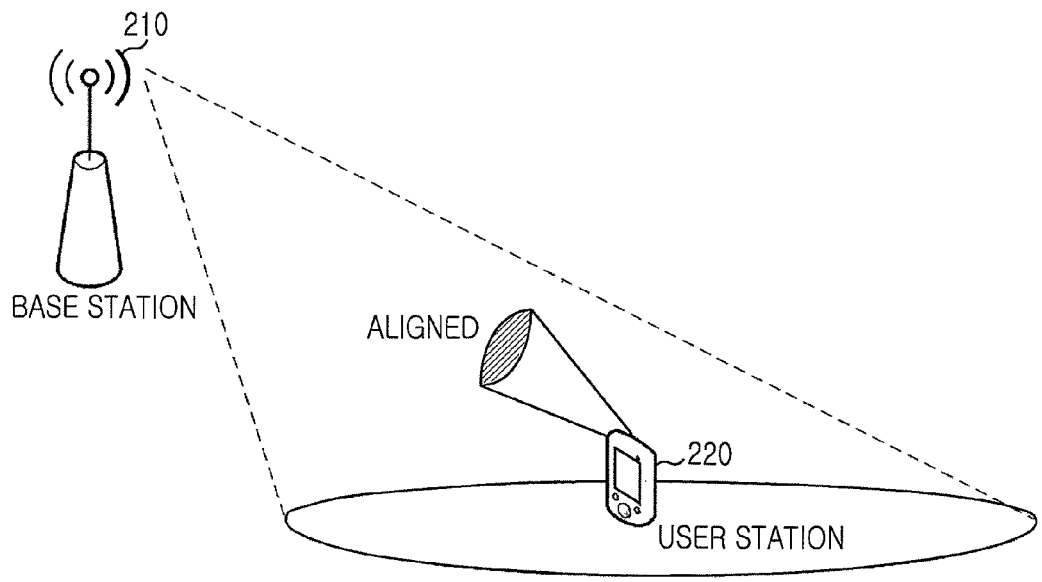
FIGS. 2A through 2D illustrate example beam directions of a base station and a user station in a wireless communication system according to an embodiment of the present invention.

Referring first to FIG. 2A, the beam direction for transmission and reception of the base station 210 matches the beam direction for transmission and reception of the user station 220. When the beam direction of the base station 210 faces the user station 220, the user station 220 is placed in a beam range of the base station 210. To increase reliability and efficiency of the data transmission and reception, the user station 220 in the beam range also forms the beam toward the base station 210. When the beam directions of the base station 210 and the user station 220 are aligned as shown in FIG. 2A, best communication quality is obtained.

In general, beam training is used to align the beam direction between the base station 210 and the user station 220. The beam training is divided into an uplink and a downlink. In the downlink, the base station 210 assigns a particular sequence for the beam training to beam training reference signals of a particular direction, and transmits the reference signals as the beam of the particular direction. Hence, the user station 220 informs the base station 210 of a particular sequence value of the reference signal having the best communication quality among one or more beam training references signals transmitted by the base station 210. Thus, the aligned beam direction of the base station 210 and the user station 220 can be determined. In the uplink, the user station 220 assigns a particular sequence for the beam training to beam training reference signals of a particular direction, and transmits the reference signals as the beam of the particular direction. The base station 210 informs the user station 220 of a particular sequence value of the reference signal having the best communication quality among the beam training references signals.

Figure 2B:
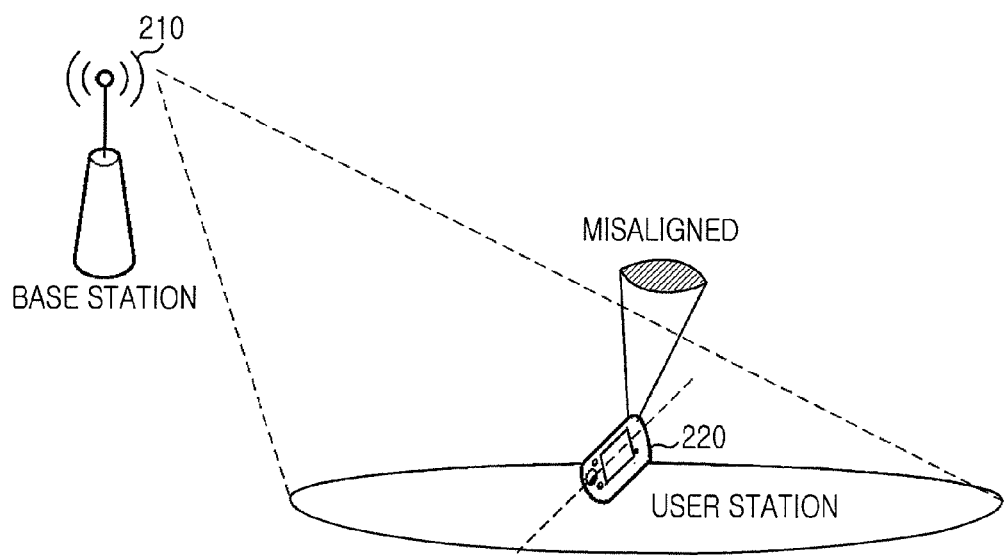
Figure 2C:
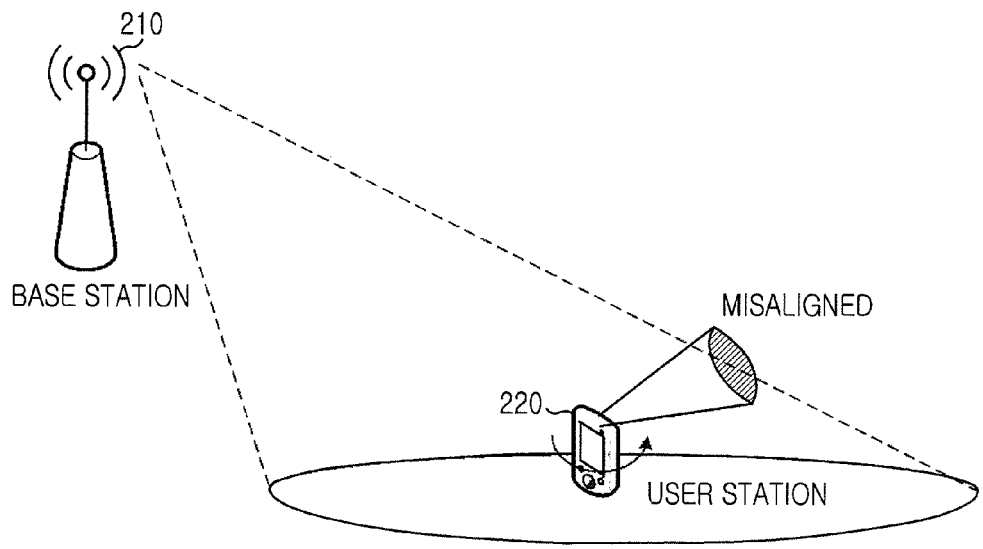
Figure 2D:
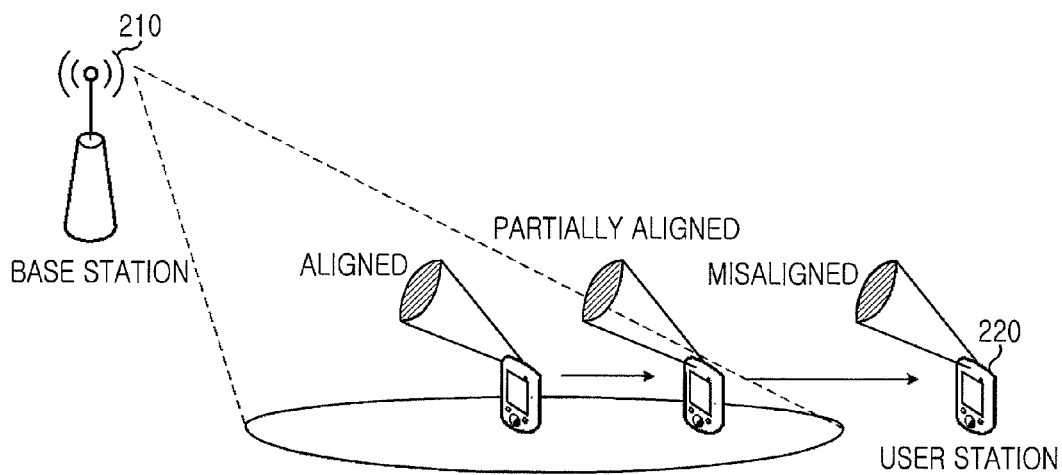

As stated above, the beam training method is adequate for a stationary base station and a stationary user station. However, when the user station 220 frequently moves during a short time, it is difficult to apply the beam alignment method using the beam training. This problem is shown in FIGS. 2B, 2C and 2D. FIGS. 2B, 2C and 2D depict misalignment of the beam direction according to the rotation and the movement of the user station 220. Referring to FIG. 2B, as the user station 220 is tilted, the beam directions of the base station 210 and the user station 220 are misaligned according to the tilt. Referring to FIG. 2C, as the user station 220 rotates, the beam directions of the base station 210 and the user station 220 are misaligned according to the rotation. Referring to FIG. 2D, as the user station 220 moves, the beam directions of the base station 210 and the user station 220 are misaligned according to the movement.

As shown in FIGS. 2B, 2C and 2D, when the user acts or moves, the beam directions between the base station 210 and the user station 220 can become misaligned. In this case, communication quality of the base station 210 and the user station 220 may deteriorate. Further, since the rotation or the movement of the user may be relatively frequent over a relatively short time, it may be hard to overcome the misalignment using general beam training techniques. In more detail, to detect the change of the beam direction of the user station 220, the base station 210 needs to check the change of the beam direction of the user station 220 on a frequent basis. Accordingly, control messages are typically exchanged frequently. As more accurate information of the beam direction change of the user station 220 is required, control messages are exchanged more frequently, which results in system overhead. Hence, the present invention provides a method for overcoming the beam direction misalignment according to the rotation or the movement of the user station 220.

Figure 3:
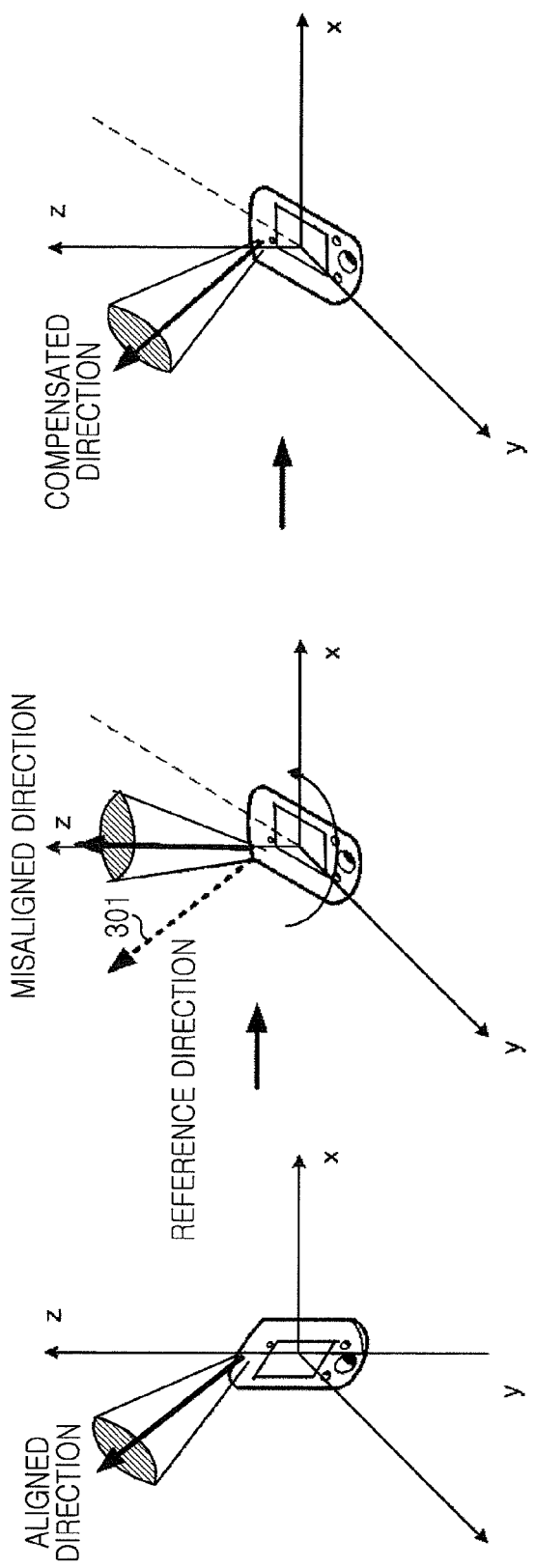
FIG. 3 illustrates an example beam direction compensated based on rotation of the user station in the wireless communication system according to an embodiment of the present invention.

FIG. 3 depicts an example beam direction compensation based on the rotation of a user station in the wireless communication system according to an embodiment of the present invention.

Referring to FIG. 3, when the beam direction between a base station and the user station is aligned, the user station sets the aligned beam direction to a reference direction 301. For example, the reference direction 301 of the beam direction can be set through beam training. For example, the reference direction 301 of the beam direction can be set to the aligned beam direction based on location information between the base station and the user station. Besides, various schemes can be applied to set the reference direction 301.

Next, when the rotation of the user station tilts or rotates the beam direction or when the movement of the user station changes the beam direction, the user station measures the change in accordance with the reference direction. That is, the user station measures a physical change value in three (i.e., three-dimensions) directions. The physical change value of the three directions can be measured as an angle, an angular speed, an angular acceleration, a rotation angle, a rotation angular speed, a rotation acceleration, a travel distance, a travel speed, and a travel acceleration in the horizontal (e.g., azimuthal) directions and the vertical (altitude) direction. The physical change can be measured using various well-known schemes. Herein, the physical change can be measured using any of a variety of sensors. For example, the sensors can include at least one of a compass sensor, an accelerometer, a G-sensor, and a Gyroscope. Alternatively, a Global Positioning System (GPS) can be used. Alternatively, angle of arrival of an electric signal transmitted by then base station can be used. Alternatively, trigonometry using locations of and received signals from the base station or Access Points (APs) can be used.

The user station maintains the beam direction in the reference direction 301 by compensating for the beam direction according to the physical change value. For example, when a user turns or moves his/her head during the phone call, the beam direction of the user station aligned with the base station changes. When geographical space is represented in orthogonal directions of x, y and z and the beam direction rotates from the reference direction 301 to the z axis by 30 degrees, the beam direction of the user station may be maintained in the reference direction 301 by rotating the beam direction of the user station in the z axis by −30 degrees. Hence, even when the beam direction of the user station rotates by 30 degrees, the base station can communicate with the user station in the existing beam direction regardless of the beam direction rotation of the user station. In other words, when the present algorithm for compensating for the beam direction directly by the user station is applied to the physical direction and location changes caused by rotation or movement of the user station, it is similar to a case in which the base station communicates with the user station that does not physically move or rotate. In this case, the uplink and downlink beamforming may be fulfilled without undue system overhead.

The technique for maintaining the beam direction sets the beam direction of the user station for sustaining relatively good communication quality between the base station and the user station to the reference direction, measures the physical change value when the beam direction changes, and compensates for the beam direction based on the measured physical change value. Hence, the technique for maintaining the beam direction may be referred to as a beam locking scheme. The beam locking scheme can be widely applied to any station configured to move or rotate while being used in the wireless communication system.

Now, an operation and structure of an apparatus for the beam locking technique as explained above are described by referring to the drawings.

Hereafter, it is assumed that the reference direction of the beam is set between the base station and the user station before beam locking. The reference beam direction can be initially set or periodically reset between the base station and the user station. For example, the apparatus can set the beam direction in a plurality of candidate directions, repeatedly transmit a training reference signal, and select the candidate direction of the matching beam direction. In addition, the apparatus can adjust the beam width of the beam formed according to the beamforming technique.

Figure 4:
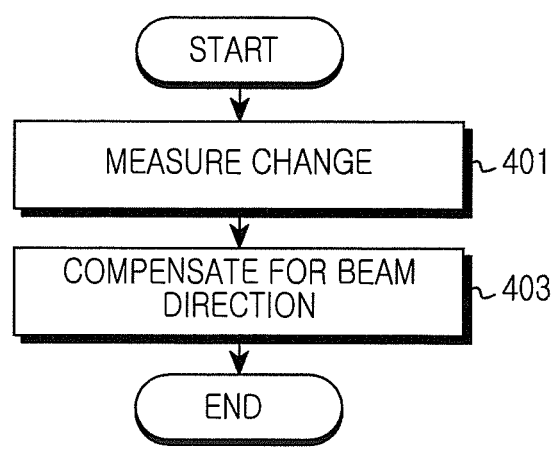
FIG. 4 illustrates an example beam locking method in the wireless communication system according to an embodiment of the present invention.

FIG. 4 illustrates an example beam locking method in the wireless communication system according to an embodiment of the present invention.

Referring to FIG. 4, the apparatus measures changes based on the reference direction of the beam; that is, the change of the location according to the movement and the change of the direction and the slope according to the rotation/tilt in step 401. For example, the apparatus can periodically measure the change at regular time intervals. When there is no movement/rotation/tilt of the apparatus, the change is measured as zero. For example, the change of the location and the change of the direction and the slope can be measured using the sensor, the GPS, the angle of the arrival of the signal, or the trigonometry using the received signal.

In step 403, the apparatus compensates for the beam direction. That is, the apparatus calculates a new beamforming parameter which aligns the beam direction altered by the change with the reference direction, and compensates for the beam direction using the new beamforming parameter. In doing so, the new beamforming parameter is determined by a beamforming parameter of the reference direction and the change. For example, the apparatus determines the new beamforming parameter according to a predefined function or rule which uses the beamforming parameter of the reference direction and the change as input variables. Alternatively, the apparatus determines the new beamforming parameter using a mapping table which defines new beamforming parameters based on the change compared with the beamforming parameter of the reference direction.

The beamforming parameter includes a result value of the function which uses the physical change value as its input variable. In detail, when the beamforming parameter of the reference direction is $(\alpha,\beta,\gamma)$, the physical change value is $(a,b,c)$, and the new beamforming parameter changed by the physical change value is $(\alpha^*,\beta^*,\gamma^*)$, the beamforming parameter can be determined according to Equation (1).

$$\alpha^*(\alpha,a,b,c) = \alpha \times f_1(a,b,c) + g_1(a,b,c)$$

$$\beta^*(\beta,a,b,c) = \beta \times f_2(a,b,c) + g_2(a,b,c)$$

$$\gamma^*(\gamma,a,b,c) = \gamma \times f_3(a,b,c) + g_3(a,b,c) \qquad (1)$$

In Equation (1), $\alpha$, $\beta$ and $\gamma$ denote the beamforming parameters in the reference direction, a, b and c denote the physical change values, and α*, β* and γ* denote the new beamforming parameters altered by the physical change values.

That is, the values for determining the new beamforming parameter are the beamforming parameter of the reference beam direction and the physical change value measured by the user station. Herein, $f_1$, $f_2$, $f_3$, $g_1$, $g_2$ and $g_3$ can be defined by the predefined function or rule or the mapping table.

The beamforming parameter can vary according to the selected beamforming scheme. For example, in digital beamforming, the beamforming parameter can include at least one of an index of a precoding codebook used in a digital stage, a beamforming matrix, and a beamforming vector. For another example, in analog beamforming, the beamforming parameter can include phase and amplitude values per antenna. For another example, in a case in which the antenna may be physically moved, the beamforming parameter can be a physical attitude control value such as rotation or slope. For another example, when antennas, antenna groups, or antenna arrays corresponding to the beam direction are equipped in advance and a beam index or an antenna index is assigned to each beam direction, the beamforming parameter can include at least one of the beam index and the antenna index.

Although not depicted in FIG. 4, the apparatus can set the reference direction before measuring the change. For example, the apparatus can set the reference direction through beam training. For example, the apparatus can set the beam directions in multiple candidate directions, repeatedly transmit the training reference signal, and select the candidate direction aligned with the beam direction. In addition, the apparatus can refine the beam to use a relatively narrower beam.

Figure 5:
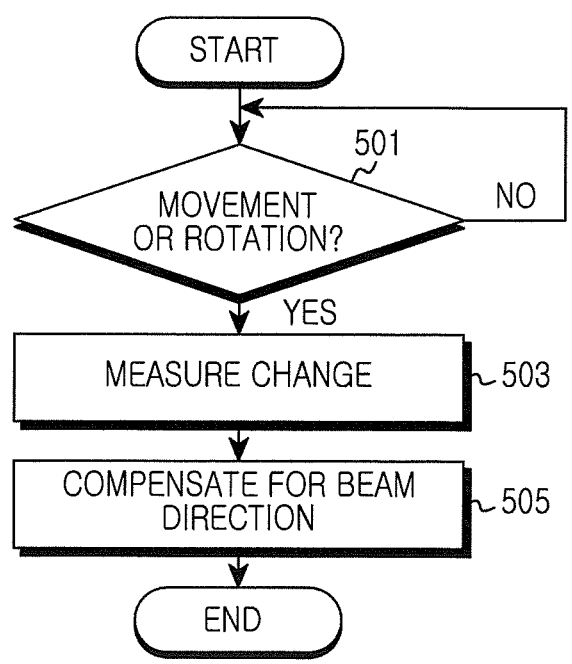
FIG. 5 illustrates an example beam locking method in the wireless communication system according to another embodiment of the present invention.

FIG. 5 illustrates an example beam locking method according to another embodiment of the present invention.

In step 501, the apparatus determines whether the movement or the rotation occurs. That is, the apparatus determines whether at least one of the location, the slope, and the direction changes.

When the movement or the rotation occurs, the apparatus measures the change of the location according to the movement and the change of the direction and the slope according to the rotation/slope in step 503. By contrast, when movement or rotation of the apparatus does not occur, the apparatus may not perform step 503. That is, with parameters (a,b,c) for the physical change and thresholds (a',b', c') for determining the rotation, the apparatus can measure the change only when at least one of (a,b,c) is greater than or equal to at least a threshold value (a',b', c'); that is, only when a≥a', b≥b' or c≥c'. For example, the change of the location and the change of the direction and the slope can be measured using the sensor, the GPS, the angle of the arrival of the signal, or the trigonometry using the received signal.

In step 505, the apparatus compensates for the beam direction in step 505. That is, the apparatus calculates a new beamforming parameter which aligns the beam direction altered by the change with the reference direction, and compensates for the beam direction using the new beamforming parameter. In so doing, the new beamforming parameter is determined by the beamforming parameter of the reference direction and the change. For example, the apparatus can determine the new beamforming parameter according to the predefined rule which uses the beamforming parameter of the reference direction and the change as its input variables. Alternatively, the apparatus can determine the new beamforming parameter using the mapping table which defines the new beamforming parameters based on the change against the beamforming parameter of the reference direction. More specifically, the new beamforming parameter can be determined using Equation (1). The beamforming parameter can vary according to the selected beamforming scheme. For example, in digital beamforming, the beamforming parameter can include at least one of the index of the precoding codebook used in the digital stage, the beamforming matrix, and the beamforming vector. For another example, in analog beamforming, the beamforming parameter can include the phase and amplitude values per antenna. For another example, in beamforming which the antenna is physically moved, the beamforming parameter can be the physical attitude control value such as rotation or slope. For another example, when antennas, antenna groups, or antenna arrays corresponding to the beam direction are equipped in advance and the beam index or the antenna index is assigned to each beam direction, the beamforming parameter can include at least one of the beam index and the antenna index.

Although not depicted in FIG. 5, the apparatus can set the reference direction before determining whether the movement or the rotation occurs. For example, the apparatus can set the reference direction through beam training. For example, the apparatus can set the beam directions in multiple candidate directions, repeatedly transmit the training reference signal, and select the candidate direction aligned with the beam direction. In addition, the apparatus can refine the beam in order to use the narrower beam.

Figure 6:
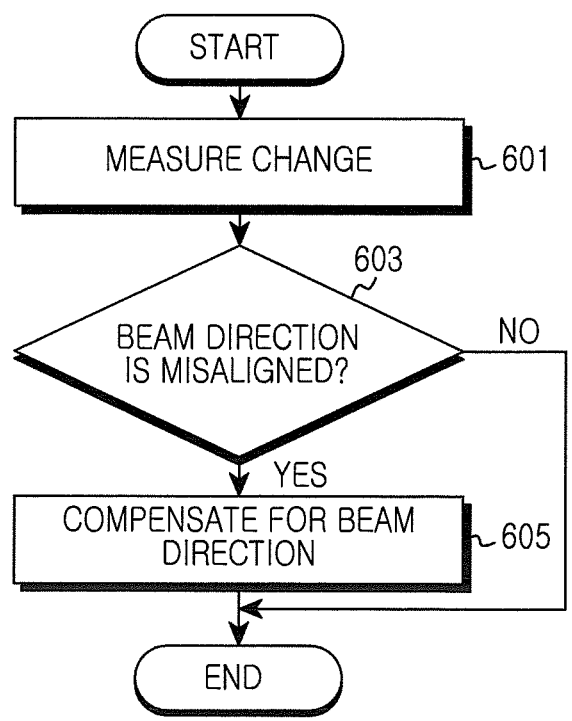
FIG. 6 illustrates an example beam locking method in the wireless communication system according to yet another embodiment of the present invention.

FIG. 6 illustrates an example beam locking method according to another embodiment of the present invention.

In step 601, the apparatus measures the change of the location and direction according to a movement and change of the direction and the slope according to the rotation/tilt of the apparatus. For example, the apparatus can periodically measure the change at regular time intervals. When there is no movement/rotation/tilt of the apparatus, the change is measured as zero. For example, the change of the location and the change of the direction and the slope can be measured using a sensor, such as a GPS device, the angle of the arrival of the signal, or the trigonometry using the received signal.

In step 603, the apparatus determines whether the beam direction is misaligned. For example, when the change is zero, there is no misalignment of the beam direction. When the change is not zero but trivial, the beam direction is not considered to be misaligned. For example, with the parameters (a,b,c) representing the physical change, the parameters (α,β,γ) representing the beam direction determined by the function using the physical change as the input variable, and parameters (α',β',γ') representing the threshold beam direction, the apparatus can determine the misalignment of the beam direction only when at least one of (a,b,c) is greater than or equal to at least one threshold (α',β',γ'); that is, only when a≥α', b≥β' or c≥γ', and compensate for the beam direction. The process is completed when no further alignment of the beam direction is to be performed.

By contrast, when the beam direction is misaligned, the apparatus compensates for the beam direction in step 605. That is, the apparatus calculates the new beamforming parameter which aligns the beam direction altered by the change with the reference direction, and compensates for the beam direction using the new beamforming parameter. In doing so, the new beamforming parameter is determined by the beamforming parameter of the reference direction and the change. For example, the apparatus determines the new beamforming parameter according to the predefined rule which uses the beamforming parameter of the reference direction and the change as the input variables. Alternatively, the apparatus determines the new beamforming parameter using the mapping table which defines the new beamforming parameters based on the change against the beamforming parameter of the reference direction. More specifically, the new beamforming parameter can be determined according to Equation (1). The beamforming parameter can vary according to the selected beamforming scheme. For example, in digital beamforming, the beamforming parameter includes at least one of the index of the precoding codebook used in the digital stage, the beamforming matrix, and the beamforming vector. For another example, in analog beamforming, the beamforming parameter includes the phase and amplitude values per antenna. For another example, in beamforming in which the antenna is physically moved, the beamforming parameter can be the physical attitude control value such as rotation or slope. For example, when antennas, antenna groups, or antenna arrays corresponding to the beam direction are equipped in advance and the beam index or the antenna index is assigned to each beam direction, the beamforming parameter can include at least one of the beam index and the antenna index.

Although not depicted in FIG. 6, the apparatus can set the reference direction before determining whether the movement or the change in direction occurs. For example, the apparatus can set the reference direction through beam training. For example, the apparatus can set the beam direction in one of the candidate directions, repeatedly transmit the training reference signal, and select the candidate direction aligned with the beam direction. In addition, the apparatus can adjust the beamwidth of the beam.

Figure 7:
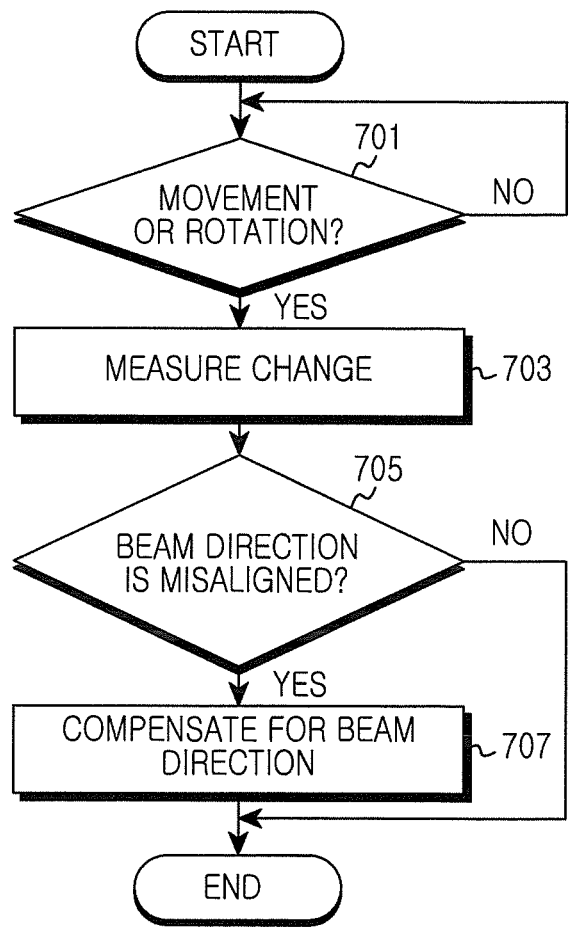
FIG. 7 illustrates an example beam locking method in the wireless communication system according to another embodiment of the present invention.

FIG. 7 illustrates an example beam locking method in the wireless communication system according to still another embodiment of the present invention.

In step 701, the apparatus determines whether the movement or the rotation occurs. That is, the apparatus determines whether at least one of the location, the slope, and the direction changes.

When movement or rotation occurs, the apparatus measures the change of the location according to the movement and the change of the direction and the slope according to the rotation/slope in step 703. By contrast, when the movement or the rotation does not occur, the apparatus does not perform step 703. That is, with the parameters (a,b,c) for the physical change and the thresholds (a',b',c') for determining the rotation, the apparatus determine that a change occurs when at least one of (a,b,c) is greater than or equal to at least one threshold (a',b',c'); that is, when a≥a', b≥b' or c≥c'. For example, the change of the location and the change of the direction and the slope can be measured using a sensor, such as a GPS, the angle of the arrival of the signal, or the trigonometry using the received signal.

In step 705, the apparatus determines whether the beam direction is misaligned. For example, when the change is zero, there no misalignment of the beam direction is considered to have occurred. When the change is not zero but trivial, no e misalignment of the beam direction is considered to have occurred. For example, with the parameters (a,b,c) for the physical change, the parameters (α,β,γ) of the beam direction determined by the function using the physical change as the input variable, and the parameters (α',β',γ') of the beam direction of the threshold, the apparatus can determine the misalignment of the beam direction when at least one of (a,b,c) is greater than or equal to at least one threshold (α',β',γ'); that is, when a≥α', b≥β' or c≥γ', and compensate for the beam direction. When there is no misalignment of the beam direction, the process is completed.

When the beam direction is misaligned, the apparatus compensates for the beam direction in step 707. That is, the apparatus calculates the new beamforming parameter which aligns the beam direction altered by the change with the reference direction, and compensates for the beam direction using the new beamforming parameter. In doing so, the new beamforming parameter is determined by the beamforming parameter of the reference direction and the change. For example, the apparatus can determine the new beamforming parameter according to the specified rule which uses the beamforming parameter of the reference direction and the change as input variables. Alternatively, the apparatus can determine the new beamforming parameter using the mapping table which defines the new beamforming parameters based on the change against the beamforming parameter of the reference direction. More specifically, the new beamforming parameter can be determined according to Equation (1). The beamforming parameter can vary according to the selected beamforming scheme. For example, in digital beamforming, the beamforming parameter can include at least one of the index of the precoding codebook used in the digital stage, the beamforming matrix, and the beamforming vector. For another example, in analog beamforming, the beamforming parameter can include the phase and amplitude values per antenna. For another example, in beamforming in which the antenna is physically moved, the beamforming parameter can include the physical attitude control value such as rotation or slope. For another example, when antennas, antenna groups, or antenna arrays corresponding to the beam direction are equipped in advance and the beam index or the antenna index is assigned to each beam direction, the beamforming parameter can include at least one of the beam index and the antenna index.

Although not depicted in FIG. 7, the apparatus can set the reference direction before determining whether the movement or the rotation occurs. For example, the apparatus can set the reference direction through beam training. For another example, the apparatus can set the beam direction in multiple candidate directions, repeatedly transmit the training reference signal, and select the candidate direction aligned with the beam direction. In addition, the apparatus can refine the beam so as to use the narrower beam.

Figure 8:
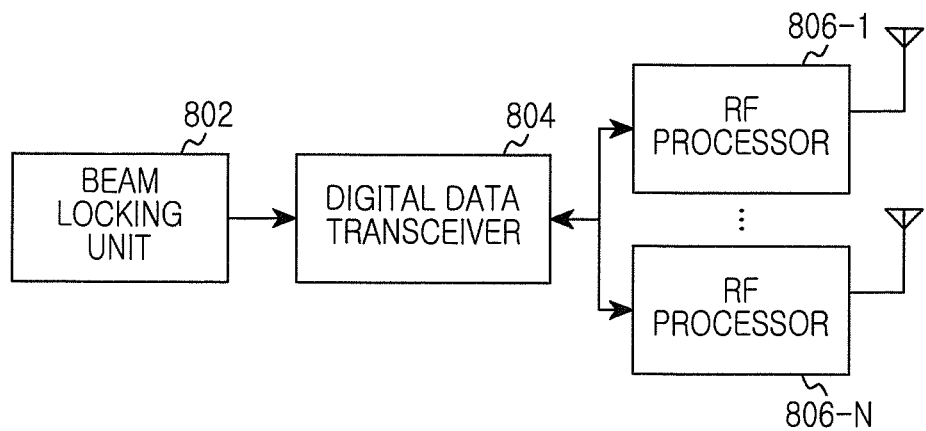
FIG. 8 illustrates an example apparatus for locking the beam in the wireless communication system according to an embodiment of the present invention.

FIG. 8 is an example apparatus for beam locking according to an embodiment of the present invention.

As shown in FIG. 8, the apparatus includes a beam locking unit 802, a digital data transceiver 804, and multiple Radio Frequency (RF) processors 806-1 through 806-N.

The beam locking unit 802 sets the reference direction of the beam and locks the beam to sustain the reference direction of the beam. That is, the beam locking unit 802 recognizes and measures the movement, the tilt, and rotation of the apparatus, calculates the beamforming parameter for aligning the beam direction with the reference direction, and provides the beamforming parameter to the digital data transceiver 804. For example, the beamforming parameter includes at least one of the precoding codebook index, the beamforming matrix, and the beamforming vector.

Figure 12:
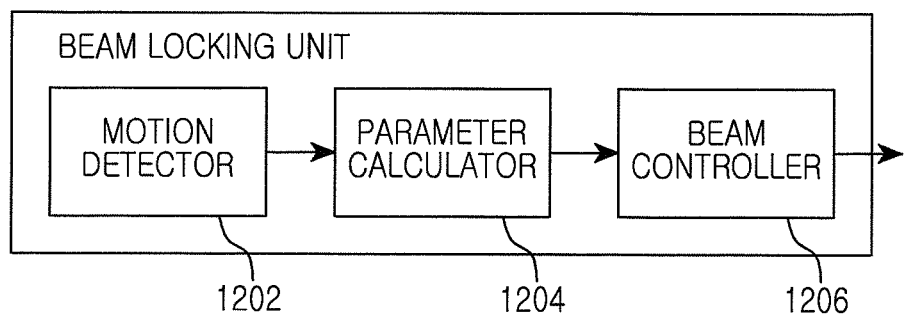
FIG. 12 illustrates an example beam locking unit in the wireless communication system according to an embodiment of the present invention.

For example, the beam locking unit 802 can be constructed as shown in FIG. 12. Referring to FIG. 12, the beam locking unit 802 includes a motion detector 1202 for measuring the change of the location according to the movement and the change of the direction and the slope according to the rotation/tilt, a parameter calculator 1204 for calculating the new beamforming parameter for aligning the beam direction altered by the change with the reference direction, and a beam controller 1206 for controlling the beamforming of the digital data transceiver 804 according to the new beamforming parameter. That is, the beam controller 1206 controls to adjust the beam direction according to the beamforming parameter determined by the parameter calculator 1204. Herein, the motion detector 1202 can measure the change on the periodic basis at regular time intervals or in the event of a detected motion or rotation of the apparatus.

Figure 13:
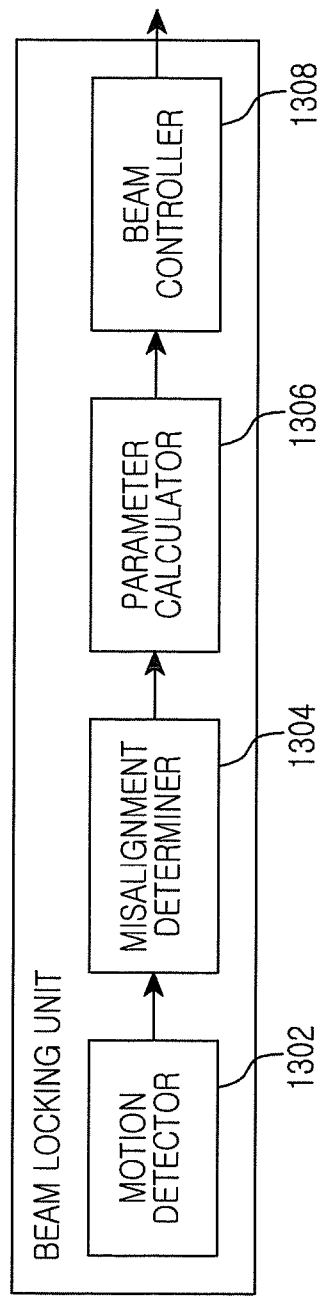
FIG. 13 illustrates an example beam locking unit in the wireless communication system according to another embodiment of the present invention.

For example, the beam locking unit 802 can be constructed as shown in FIG. 13. Referring to FIG. 13, the beam locking unit 802 includes a motion detector 1302 for measuring the change of the location according to the movement and the change of the direction and the slope according to the rotation/tilt, a misalignment determiner 1304 for determining whether the current beam is misaligned with the reference direction according to the change, a parameter calculator 1306 for, when the misalignment determiner 1304 determines the misalignment, calculating the new beamforming parameter for aligning the changed beam direction with the reference direction, and a beam controller 1306 for controlling the beamforming of the digital data transceiver 804 according to the new beamforming parameter. That is, the beam controller 1308 adjusts the beam direction according to the beamforming parameter determined by the parameter calculator 1306. Herein, the motion detector 1302 can measure the change on the periodic basis at regular time intervals or in the event of motion or rotation of the apparatus.

The digital data transceiver 804 converts a transmit bit sequence to a baseband signal and converts baseband signals output from the RF processors 806-1 through 806-N to the receive bit sequence according to a protocol of the communication system. The digital data transceiver 804 can carry out channel coding and decoding, data modulation and demodulation, precoding for multi-antenna mapping, post coding, Analog/Digital (A/D) conversion, Digital/Analog (D/A) conversion, Fast Fourier Transform (FFT), Inverse FFT (IFFT), and digital beamforming. For example, in a data transmission conforming to an Orthogonal Frequency Division Multiplexing (OFDM) protocol, the digital data transceiver 804 generates complex symbols by encoding and modulating the transmit bit sequence, maps the complex symbols to subcarriers, and constitutes OFDM symbols through the IFFT and Cyclic Prefix (CP) insertion. The digital data transceiver 804 performs the digital forming. That is, the digital data transceiver 804 multiplies the signal sequence to transmit in each antenna path by the beamforming vector or the beamforming matrix. In particular, the digital data transceiver 804 conducts the beamforming according to at least one of the precoding codebook index, the beamforming matrix, and the beamforming vector provided from the beam locking unit 802.

The RF processors 806-1 through 806-N performs functions, such as signal band conversion and amplification, to transmit and receive wireless signals. That is, the RF processors 806-1 through 806-N up-convert the baseband signals for transmission, which are fed from the digital data transceiver 804, to RF signals, transmit the RF signals over antennas, and down-convert RF signals received over the antennas to baseband signals. For example, the RF processors 806-1 through 806-N each can include at least one of an amplifier, a mixer, a frequency filter, an oscillator, a Digital to Analog Converter (DAC), an Analog to Digital Converter (ADC), and a phase shifter/controller for controlling the antenna direction.

Although not depicted in FIG. 8, the apparatus can further include a beam trainer for training the beam with another apparatus. For example, to determine the reference direction of the beam of the apparatus, the beam trainer can set the beam direction in each of the candidate directions, repeatedly transmit the training reference signal, and select a feedback direction from the other apparatus as the reference direction. Conversely, to determine the reference direction of the beam of the other apparatus, the beam trainer can receive multiple training reference signals from the other apparatuses and notify the other apparatus of the sequence value of one training reference signal having the best communication quality. In addition, the beam trainer can continually refine the beam in order to allow use of a narrower beam. Prior to the operations of the beam locking unit 802, the beam trainer can set the reference direction through beam training.

Figure 9:
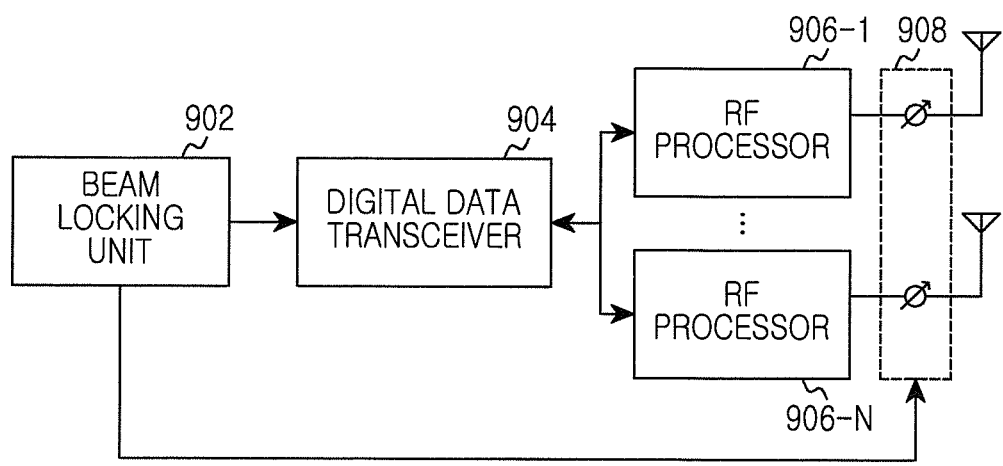
FIG. 9 illustrates an example apparatus for locking the beam in the wireless communication system according to another embodiment of the present invention.

FIG. 9 illustrates an example apparatus for beam locking according to another embodiment of the present invention.

As shown in FIG. 9, the apparatus includes a beam locking unit 902, a digital data transceiver 904, a plurality of RF processors 906-1 through 906-N, and a beamformer 908.

The beam locking unit 902 sets the reference direction of the beam and locks the beam to maintain the reference direction of the beam. That is, the beam locking unit 902 recognizes and measures the movement, the tilt, and rotation of the apparatus, calculates the beamforming parameter for aligning the beam direction with the reference direction, and provides the beamforming parameter to the beamformer 908. For example, the beamforming parameter includes the phase and amplitude values of the signals received from each antenna.

For example, the beam locking unit 902 can be constructed as shown in FIG. 12. Referring to FIG. 12, the beam locking unit 902 includes the motion detector 1202 for measuring the change of the location according to the movement and the change of the direction and the slope according to the rotation/tilt, the parameter calculator 1204 for calculating the new beamforming parameter for aligning the beam direction altered by the change with the reference direction, and the beam controller 1206 for controlling the beamforming of the beamformer 908 according to the new beamforming parameter. Herein, the motion detector 1202 can measure the change on the periodic basis at regular time intervals or in the event of motion or rotation of the apparatus.

For example, the beam locking unit 902 can be constructed as shown in FIG. 13. Referring to FIG. 13, the beam locking unit 902 includes the motion detector 1302 for measuring the change of the location according to the movement and the change of the direction and the slope according to the rotation/tilt, the misalignment determiner 1304 for determining whether the current beam is misaligned with the reference direction according to the change, the parameter calculator 1306 for, when the misalignment determiner 1304 determines the misalignment, calculating the new beamforming parameter for aligning the changed beam direction with the reference direction, and the beam controller 1306 for controlling the beamforming of the beamformer 908 according to the new beamforming parameter. Herein, the motion detector 1302 can measure the change on the periodic basis at regular time intervals or in the event of motion or rotation of the apparatus.

The digital data transceiver 904 converts a transmit bit sequence to a baseband signal and converts baseband signals output from the RF processors 906-1 through 906-N to the receive bit sequence according to the physical layer standard of the system. The digital data transceiver 904 can perform channel coding and decoding, data modulation and demodulation, precoding for the multi-antenna mapping, post coding, A/D conversion, D/A conversion, FFT processing, and IFFT processing. For example, in the data transmission conforming to the OFDM protocol, the digital data transceiver 904 generates complex symbols by encoding and modulating the transmit bit sequence, maps the complex symbols to subcarriers, and constitutes OFDM symbols through the IFFT and the CP insertion.

The RF processors 906-1 through 906-N perform functions, such as signal conversion and amplification, to transmit and receive the signals over a radio channel. That is, the RF processors 906-1 through 906-N up-convert the baseband signals for transmission, which are fed from the digital data transceiver 904, to RF signals, transmit the RF signals over antennas, and down-convert RF signals received over the antennas to baseband signals. For example, the RF processors 906-1 through 906-N each can include at least one of an amplifier, a mixer, a frequency filter, an oscillator, a DAC, an ADC, and a phase shifter/controller for controlling the antenna direction.

The beamformer 908 includes multiple components, and each component adjusts the phase and the amplitude of the signal in each antenna path. That is, the beamformer 908 performs the beamforming by adjusting the phase and the amplitude of the signal transmitted in each antenna path according to the phase and amplitude values of the signals per antenna fed from the beam locking unit 902. While the RF processors 906-1 through 906-N each has the single antenna path and the path includes the single component of the beamformer 908 per antenna in FIG. 9, each antenna can have the transmit path and the receive path separately. In this case, two components of the beamformer 908 can be provided per antenna.

Although not depicted in FIG. 9, the apparatus can further include a beam trainer for training the beam with the another apparatus. For example, to determine the reference direction of the beam of the apparatus, the beam trainer can set the beam direction in multiple candidate directions, repeatedly transmit the training reference signal, and select a feedback direction from the other apparatus as the reference direction. Conversely, to determine the reference direction of the beam of the other apparatus, the beam trainer can receive multiple training reference signals from the other apparatus and notify the other apparatus of the sequence value of one training reference signal having the best communication quality. In addition, the beam trainer can continually refine the beam in order to use a narrower beam. Prior to operation of the beam locking unit 902, the beam trainer can set the reference direction through beam training.

Figure 10:
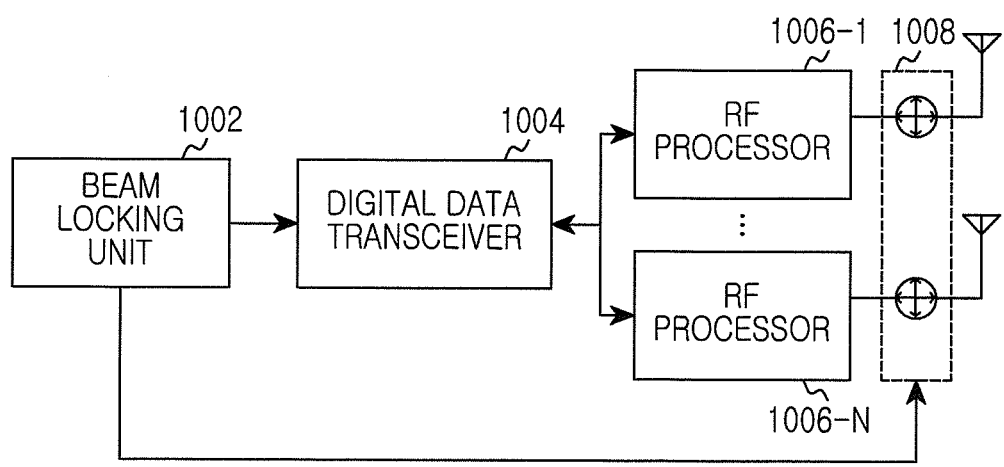
FIG. 10 illustrates an example apparatus for locking the beam in the wireless communication system according to another embodiment of the present invention.

FIG. 10 illustrates an example apparatus for beam locking according to another embodiment of the present invention.

As shown in FIG. 10, the apparatus includes a beam locking unit 1002, a digital data transceiver 1004, a plurality of RF processors 1006-1 through 1006-N, and an antenna driver 1008.

The beam locking unit 1002 sets the reference direction of the beam and locks the beam to maintain the reference direction of the beam. That is, the beam locking unit 1002 recognizes and measures the movement, the tilt, and the rotation of the apparatus, calculates the beamforming parameter for aligning the beam direction with the reference direction, and provides the beamforming parameter to the antenna driver 1008. For example, the beamforming parameter includes the physical attitude control value such as rotation and tilt of each antenna.

For example, the beam locking unit 1002 can be constructed as shown in FIG. 12. Referring to FIG. 12, the beam locking unit 1002 includes the motion detector 1202 for measuring the change of the location according to the movement and the change of the direction and the slope according to the rotation/tilt, the parameter calculator 1204 for calculating the new beamforming parameter for aligning the beam direction altered by the change with the reference direction, and the beam controller 1206 for controlling the beamforming of the antenna driver 1008 according to the new beamforming parameter. Herein, the motion detector 1202 can measure the change on the periodic basis at regular time intervals or in the event of motion or rotation of the apparatus.

For example, the beam locking unit 1002 can be constructed as shown in FIG. 13. Referring to FIG. 13, the beam locking unit 1002 includes the motion detector 1302 for measuring the change of the location according to the movement and the change of the direction and the slope according to the rotation/tilt, the misalignment determiner 1304 for determining whether the current beam is misaligned with the reference direction according to the change, the parameter calculator 1306 for, when the misalignment determiner 1304 determines the misalignment, calculating the new beamforming parameter for aligning the changed beam direction with the reference direction, and the beam controller 1306 for controlling the beamforming of the antenna driver 1008 according to the new beamforming parameter. Herein, the motion detector 1302 can measure the change on a periodic basis at regular time intervals or in the event of motion or rotation of the apparatus.

The digital data transceiver 1004 converts a transmit bit sequence to a baseband signal and converts baseband signals output from the RF processors 1006-1 through 1006-N to the receive bit sequence according to the protocol of the system. The digital data transceiver 1004 can carry out channel coding and decoding, data modulation and demodulation, precoding for the multi-antenna mapping, post coding, A/D conversion, D/A conversion, FFT processing, and IFFT processing. For example, in a data transmission conforming to the OFDM protocol, the digital data transceiver 1004 generates complex symbols by encoding and modulating the transmit bit sequence, maps the complex symbols to subcarriers, and constitutes OFDM symbols through IFFT and CP insertion.

The RF processors 1006-1 through 1006-N perform functions, such as signal conversion and amplification, to transmit and receive the signals over a radio channel. That is, the RF processors 1006-1 through 1006-N up-convert the baseband signals for transmission, which are fed from the digital data transceiver 1004, to RF signals, transmit the RF signals over antennas, and down-convert RF signals received over the antennas to baseband signals. For example, the RF processors 1006-1 through 1006-N each can include at least one of an amplifier, a mixer, a frequency filter, an oscillator, a DAC, an ADC, and a phase shifter/controller for controlling the antenna direction.

The antenna driver 1008 includes multiple components corresponding to the multiple antennas. Each component physically adjusts a signal radiation direction of each antenna. That is, the antenna driver 1008 performs the beamforming by adjusting the signal radiation direction of each antenna according to the physical attitude control value such as rotation and tilt of the antenna fed from the beam locking unit 1002.

Although not depicted in FIG. 10, the apparatus can further include a beam trainer for training the beam with another apparatus. For example, to determine the reference direction of the beam of the apparatus, the beam trainer can set the beam direction in multiple candidate directions, repeatedly transmit the training reference signal, and select the feedback direction from the other apparatus as the reference direction. Conversely, to determine the reference direction of the beam of the other apparatus, the beam trainer can receive a plurality of training reference signals from the other apparatus and notify the other apparatus of the sequence value of one training reference signal having the best communication quality. In addition, the beam trainer can continually refine the beam in order to use a narrower beam. Prior to operation of the beam locking unit 1002, the beam trainer can set the reference direction through beam training.

Figure 11:
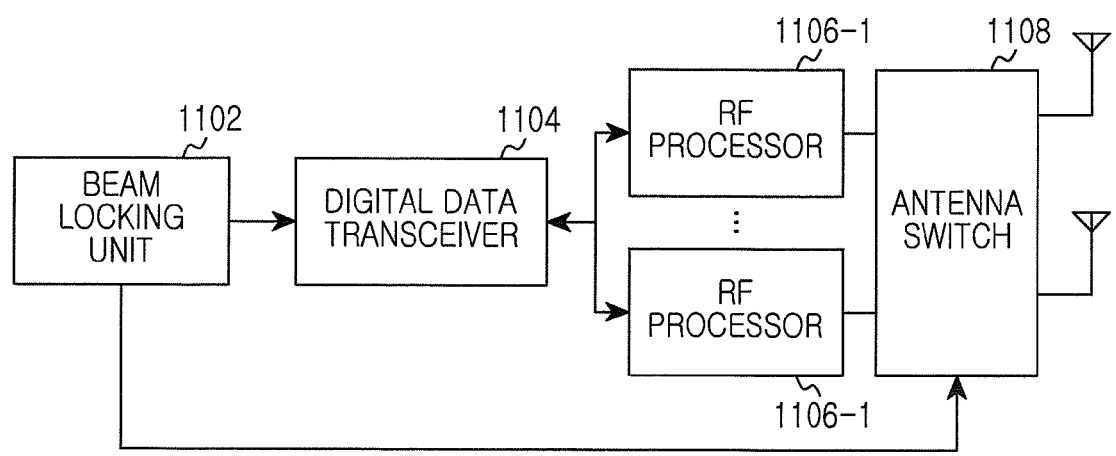
FIG. 11 illustrates an example apparatus for locking the beam in the wireless communication system according to another embodiment of the present invention.

FIG. 11 illustrates an example apparatus for beam locking according to another embodiment of the present invention.

As shown in FIG. 11, the apparatus includes a beam locking unit 1102, a digital data transceiver 1104, a plurality of RF processors 1106-1 through 1106-N, and an antenna switch 1108.

The beam locking unit 1102 sets the reference direction of the beam and locks the beam to maintain the reference direction of the beam. That is, the beam locking unit 1102 detects and measures the movement, the tilt, and the rotation of the apparatus, calculates the beamforming parameter for aligning the beam direction with the reference direction, and provides the beamforming parameter to the antenna switch 1108. For example, the beamforming parameter includes the predefined beam index or antenna index.

For example, the beam locking unit 1102 can be constructed as shown in FIG. 12. Referring to FIG. 12, the beam locking unit 1102 includes the motion detector 1202 for measuring the change of the location according to the movement and the change of the direction and the slope according to the rotation/tilt, the parameter calculator 1204 for calculating the new beamforming parameter for aligning the beam direction altered by the change with the reference direction, and the beam controller 1206 for controlling the beamforming of the antenna switch 1108 according to the new beamforming parameter. Herein, the motion detector 1202 can measure the change on the periodic basis at regular time intervals or in the event of motion or rotation of the apparatus.

For example, the beam locking unit 1102 can be constructed as shown in FIG. 13. Referring to FIG. 13, the beam locking unit 1102 includes the motion detector 1302 for measuring the change of the location according to the movement and the change of the direction and the slope according to the rotation/tilt, the misalignment determiner 1304 for determining whether the current beam is misaligned with the reference direction according to the change, the parameter calculator 1306 for, when the misalignment determiner 1304 determines the misalignment, calculating the new beamforming parameter for aligning the changed beam direction with the reference direction, and the beam controller 1308 for controlling the beamforming of the antenna switch 1108 according to the new beamforming parameter. Herein, the motion detector 1302 can measure the change on the periodic basis at regular time intervals or in the event of motion or rotation of the apparatus.

The digital data transceiver 1104 converts a transmit bit sequence to a baseband signal and converts baseband signals output from the RF processors 1106-1 through 1106-N to the receive bit sequence according to a protocol of the system. The digital data transceiver 1104 can perform channel coding and decoding, data modulation and demodulation, precoding for the multi-antenna mapping, post coding, A/D conversion, D/A conversion, FFT processing, and IFFT processing. For example, in the data transmission conforming to the OFDM protocol, the digital data transceiver 1104 generates complex symbols by encoding and modulating the transmit bit sequence, maps the complex symbols to subcarriers, and constitutes OFDM symbols through IFFT and the CP insertion.

The RF processors 1106-1 through 1106-N perform functions, such as signal conversion and amplification, to transmit and receive the signals over a radio channel. That is, the RF processors 1106-1 through 1106-N up-convert the baseband signals for transmission, which are fed from the digital data transceiver 1104, to RF signals, transmit the RF signals over antennas, and down-convert RF signals received over the antennas to baseband signals. For example, the RF processors 1106-1 through 1106-N each can include at least one of an amplifier, a mixer, a frequency filter, an oscillator, a DAC, an ADC, and a phase shifter/controller for controlling the antenna direction.

The antenna switch 1108 activates at least one antenna group corresponding to the beam index or the antenna index fed from the beam locking unit 1102. That is, the antennas of the apparatus are arranged in multiple antenna groups, the antenna groups corresponding to the beam direction, and the beam index or the antenna index is assigned to the antenna groups. Herein, one antenna group includes one antenna, a plurality of antennas, or an antenna array. Accordingly, the antenna switch 1108 connects only the antenna group indicated by the beam index or the antenna index fed from the beam locking unit 1102 and the RF processors 1106-1 through 1106-N, or switches off the other group antennas excluding the indicated antenna group.

Although not depicted in FIG. 11, the apparatus can further include a beam trainer for training the beam with another apparatus. For example, to determine the reference direction of the beam of the apparatus, the beam trainer can set the beam direction in multiple candidate directions, repeatedly transmit the training reference signal, and select the feedback direction from the other apparatus as the reference direction. Conversely, to determine the reference direction of the beam of the other apparatus, the beam trainer can receive a plurality of training reference signals from the other apparatus and notify the other apparatus of the sequence value of one training reference signal having the best communication quality. In addition, the beam trainer can continually refine the beam in order to use a narrower beam. Prior to operation of the beam locking unit 1102, the beam trainer can set the reference direction through beam training.

When the user station locks the beam as stated above, the base station can conduct beam training less frequently than with other user stations which does not lock the beam. That is, the base station needs to distinguish the user station which locks the beam and other user stations which does not lock the beam. To determine whether a particular user station performs beamforming, the base station requires control information exchange. For example, whether the user station supports the beam locking can be informed to the base station through a capability negotiation procedure of the user station.

Figure 14:
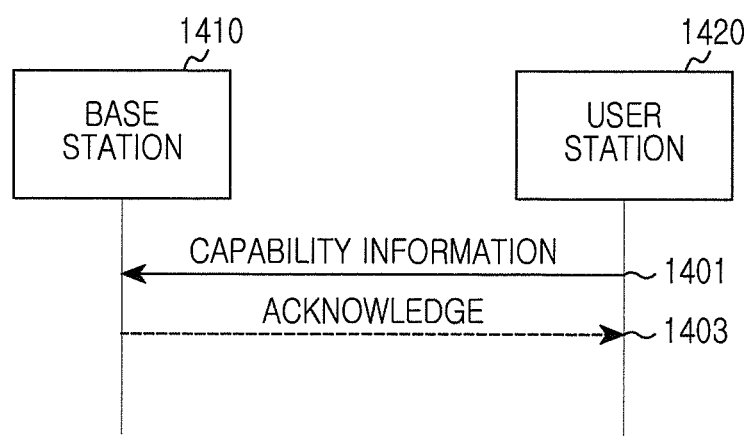
FIG. 14 illustrates example signals between a base station and the user station in the wireless communication system according to an embodiment of the present invention.

FIG. 14 depicts example signals transmitted between the base station and the user station in a wireless communication system according to an embodiment of the present invention. In step 1401, the user station 1420 transmits to the base station 1410 capability information including information indicating whether beam locking is supported. In detail, the user station 1420 generates a control message informing that beam locking is supported to maintain the beam direction in the reference direction by compensating for the change of the beam direction according to movement and rotation of the apparatus, and sends the control message to the base station 1410. For example, the information indicating whether the beam locking is supported can be arranged as shown in Table 1.

TABLE 1

| Syntax | Size (bits) | Description |
| --- | --- | --- |
| Beam locking capability | 1 | 0: beam locking is supported<br>1: beam locking is not supported |

For example, the information indicating whether the beam locking is supported can further include detailed items as shown in Table 2.

TABLE 2

| Syntax | Size (bits) | Description |
| --- | --- | --- |
| Processing delay for beam locking | xx | Time taken to compensate for misalignment of the beam direction when the misalignment of the beam direction occurs |
| Direction resolution | xx | A measurable resolution of an angle in tilt or rotation of the user station in a three-dimensional space |
| Velocity resolution | xx | A resolution for a velocity according to a motion of the user station |

In step 1403, the base station 1410 receiving the capability information sends an acknowledge message notifying the capability information reception, to the user station 1420. For example, the acknowledge message can be arranged as shown in Table 3.

TABLE 3

| Syntax | Size (bits) | Description |
| --- | --- | --- |
| Beam locking capability confirm | 1 | 0: beam locking is acknowledged<br>1: beam locking is not acknowledged |

In other various embodiments, step 1403 can be omitted if acknowledgement is not desired or required.

Figure 15:
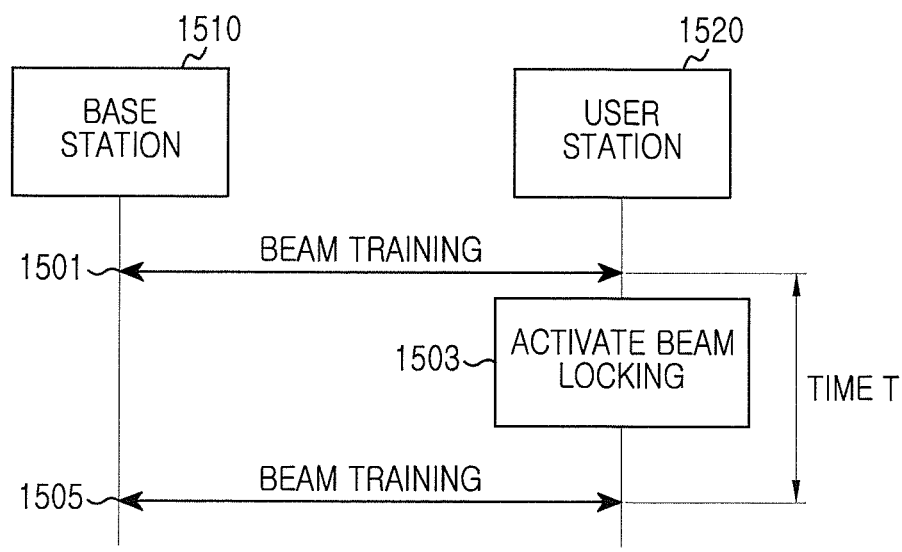
FIG. 15 illustrates an example of beam training when the beam locking is applied in the wireless communication system according to an embodiment of the present invention.

FIG. 15 depicts an example beam training technique when the beam locking is applied according to an embodiment of the present invention.

In step 1501, a base station 1510 and a user station 1520 perform beam training. For example, the base station 1510 and the user station 1520 set the beam direction in multiple candidate directions, repeatedly send the training reference signal, and determine the candidate direction aligned with the beam direction. In addition, the base station 1510 and the user station 1520 can continually refine the beam in order to utilize a narrower beam. The beam training is conducted periodically based on the time interval T.

In step 1503, during the time T, the user station 1520 activates the beam locking. Namely, the user station 1520 continuously performs the beam locking. Thus, even when the beam training is not performed, a relatively good beam direction may be maintained, the system overhead in the beam training can be reduced, and may be more advantageous in terms of accuracy and time delay.

In step 1505, after the time T, the base station 1510 and the user station 1520 conduct beam training again. Advantageously, the time T is longer than the beam training time interval when the beam locking is not applied.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As set forth above, since the beam direction is kept in the reference direction by compensating for the change of the beam direction according to the movement and the motion of the apparatus which performs the beam forming in the wireless communication system, the effective beamforming can be fulfilled even when the beam direction abruptly changes.

While the invention has been shown and described with reference to certain example embodiments thereof, it will be understood by those skilled in the art that various changes in form and details may be made therein without departing from the spirit and scope of the invention as defined by the appended claims and their equivalents.

What is claimed is:

1. An apparatus for beamforming in a wireless communication system, the apparatus comprising:
   at least one transceiver; and
   a controller operatively coupled to the at least one transceiver, wherein the controller is configured to:
   identify a reference direction of the apparatus with a beam direction of another apparatus;
   detect at least one of change of tilt, movement and rotation of the apparatus;
   identify a change of a beam direction of the apparatus corresponding to the reference direction according to at least one change of the tilt, the movement, and the rotation of the apparatus;
   identify a beamforming parameter based on the identified change of the beam direction; and
   adjust the beam direction of the apparatus based on the identified beamforming parameter.

2. The apparatus of claim 1, wherein the controller is further configured to identify whether the beam direction of the apparatus is aligned to the beam direction of the another apparatus based on beam training.

3. The apparatus of claim 1, wherein the controller is further configured to identify whether the beam direction of the other apparatus is misaligned to the reference direction of the apparatus based on location information of the apparatus and location information of the other apparatus.

4. The apparatus of claim 1, wherein the controller is further configured to identify whether the beam direction of the apparatus is misaligned to the reference direction of the apparatus after identifying the at least one change of the tilt, the movement, and the rotation.

5. The apparatus of claim 1, wherein the beamforming parameter comprises one or more of a precoding codebook index, a beamforming matrix, or a beamforming vector.

6. The apparatus of claim 5, wherein the controller is configured to generate a data by multiplying a signal sequence by the beamforming vector or the beamforming matrix, and wherein the at least one transceiver is configured to transmit, to another apparatus, the data by performing beamforming.

7. The apparatus of claim 1, wherein the beamforming parameter comprises phase and amplitude values of a signal per antenna.

8. The apparatus of claim 7, wherein the controller is configured to adjust a phase and an amplitude of each signal transmitted by each antenna path according to the phase and amplitude values of the signal per antenna.

9. The apparatus of claim 1, wherein the beamforming parameter comprises an attitude control value comprising one or more of a rotation angle or a tilt angle per antenna.

10. The apparatus of claim 9, wherein the controller is further configured to adjust a signal radiation direction of each antenna according to the attitude control value.

11. The apparatus of claim 1, wherein the beamforming parameter comprises an index indicating at least one antenna corresponding to the beam direction.

12. The apparatus of claim 11, further comprising an antenna switch, wherein the antenna switch is configured to activate the at least one antenna indicated by the index.

13. The apparatus of claim 1, wherein the controller is configured to identify the beamforming parameter based on a designated rule, a reference direction of the apparatus and at least one change of the tilt, the movement and the rotation as input variables.

14. The apparatus of claim 1, wherein the controller is configured to identify the beamforming parameter based on a mapping table, wherein the mapping table defines the beamforming parameter according to a reference direction of the apparatus and at least one change of the tilt, the movement, and the rotation, wherein the reference direction is a direction from the apparatus to another apparatus before occurrence of the at least one change of the tilt, the movement, and the rotation.

15. The apparatus of claim 1, wherein the controller is configured to adjust the beam direction periodically.

16. A method for beamforming in a wireless communication system, the method comprising:
identifying a reference direction of the apparatus with a beam direction of another apparatus;
detecting at least one change of tilt, movement and rotation of an apparatus;
identifying a change of a beam direction of the apparatus corresponding to the reference direction according to at least one change of the tilt, the movement, and the rotation of the apparatus;
identifying a beamforming parameter based on the identified change of the beam direction; and
adjusting the beam direction of the apparatus based on the identified beamforming parameter.

17. The method of claim 16, further comprising:
identifying whether the beam direction of the apparatus is aligned to the beam direction of the another apparatus based on beam training.

18. The method of claim 16, further comprising:
identifying whether the beam direction of the other apparatus is misaligned to the reference direction of the apparatus based on location information of the apparatus and location information of the other apparatus.

19. The method of claim 16, further comprising:
identifying whether the beam direction of the apparatus is misaligned to the reference direction of the apparatus after identifying the at least one change of the tilt, the movement, and the rotation.

20. The method of claim 16, wherein the beamforming parameter comprises one or more of a precoding codebook index, a beamforming matrix, or a beamforming vector.

21. The method of claim 20, further comprising:
generating a data by multiplying a signal sequence by the beamforming vector or the beamforming matrix; and
transmitting, to another apparatus, the data by performing beamforming.

22. The method of claim 16, wherein the beamforming parameter comprises phase and amplitude values of a signal per antenna.

23. The method of claim 22, wherein adjusting the beam direction of the apparatus comprises adjusting a phase and an amplitude of each signal transmitted by each antenna path according to the phase and amplitude values of the signal per antenna.

24. The method of claim 16, wherein the beamforming parameter comprises an attitude control value comprising one or more of a rotation angle or a tilt angle per antenna.

25. The method of claim 24, wherein adjusting the beam direction of the apparatus comprises adjusting a signal radiation direction of each antenna according to the attitude control.

26. The method of claim 16, wherein the beamforming parameter comprises an index indicating at least one antenna corresponding to the beam direction.

27. The method of claim 26, further comprising:
activating at least one antenna indicated by the index.

28. The method of claim 16, wherein identifying the beamforming parameter comprises:
identifying the beamforming parameter based on a designated rule, wherein the designated rule uses a reference direction of the apparatus and at least one change of the tilt, the movement, and the rotation as input variables.

29. The method of claim 16, wherein identifying the beamforming parameter comprises:
identifying the beamforming parameter based on a mapping table,
wherein the mapping table defines the beamforming parameter according to at least one change of the tilt, the movement, and the rotation,
wherein the reference direction is a direction from the apparatus to another apparatus before occurrence of the at least one change of the tilt, the movement and the rotation.

30. The method of claim 16, wherein adjusting the beam direction comprises adjusting the beam direction periodically.

* * * * *